US009919573B2

(12) United States Patent
Swoboda et al.

(10) Patent No.: US 9,919,573 B2
(45) Date of Patent: Mar. 20, 2018

(54) HEAVY-DUTY TRAILER WITH MACPHERSON INDEPENDENT WHEEL SUSPENSION

(71) Applicant: GOLDHOFER AG, Memmingen (DE)

(72) Inventors: Herbert Swoboda, Winterrieden (DE); Georg Maier, Illertissen (DE)

(73) Assignee: GOLDHOFER AG, Memmingen (DE)

( * ) Notice: Subject to any disclaimer, the term of this patent is extended or adjusted under 35 U.S.C. 154(b) by 472 days.

(21) Appl. No.: 14/390,206

(22) PCT Filed: Apr. 4, 2013

(86) PCT No.: PCT/EP2013/057106
§ 371 (c)(1),
(2) Date: Oct. 2, 2014

(87) PCT Pub. No.: WO2013/150099
PCT Pub. Date: Oct. 10, 2013

(65) Prior Publication Data
US 2015/0076783 A1  Mar. 19, 2015

(30) Foreign Application Priority Data

Apr. 5, 2012  (DE) ........................ 10 2012 205 641

(51) Int. Cl.
*B60G 15/06* (2006.01)
*B60G 3/04* (2006.01)
(Continued)

(52) U.S. Cl.
CPC ............. *B60G 15/067* (2013.01); *B60G 3/04* (2013.01); *B60G 3/06* (2013.01); *B60G 15/14* (2013.01);
(Continued)

(58) Field of Classification Search
CPC .......... B60G 15/067; B60G 3/04; B60G 3/06; B60G 15/14; B60G 2200/142; B60G 2300/042; B60G 2300/37; B60G 2300/36
See application file for complete search history.

(56) References Cited

U.S. PATENT DOCUMENTS 2,660,449 A    11/1953   MacPherson
4,276,971 A *   7/1981   Horvath ............... B60G 13/008
                                                188/322.21
(Continued)

FOREIGN PATENT DOCUMENTS

DE    1 120 290    12/1961
DE    2 851 324     5/1980
(Continued)

OTHER PUBLICATIONS

PCT Search Report issued in PCT/EP2013/057106 dated Oct. 16. 2013.
(Continued)

*Primary Examiner* — Paul N Dickson
*Assistant Examiner* — Joselynn Y Sliteris
(74) *Attorney, Agent, or Firm* — Greenblum & Bernstein, P.L.C.

(57) ABSTRACT

The invention relates to a heavy-duty trailer (10) in which at least one of the wheels (12) has a MacPherson independent wheel suspension (16). The wheel (12) can be a steered wheel, wherein the steering cylinders (94) of the steering device (40) enclose an angle (a) with the longitudinal direction (L) of the trailer. The transverse control arms (30*l*, 30*r*) can also be articulated onto the trailer frame at least in the longitudinal center plane (E) of the trailer (10).

2 Claims, 11 Drawing Sheets

(51) Int. Cl.
*B60G 3/06* (2006.01)
*B60G 15/14* (2006.01)

(52) U.S. Cl.
CPC .. *B60G 2200/142* (2013.01); *B60G 2300/042* (2013.01); *B60G 2300/36* (2013.01); *B60G 2300/37* (2013.01)

(56) References Cited

U.S. PATENT DOCUMENTS

| | | | |
|---|---|---|---|
| 4,277,086 | A | 7/1981 | Horst |
| 5,031,732 | A | 7/1991 | Batek |
| 5,542,492 | A | 8/1996 | Kaspar |
| 6,378,881 | B2 | 4/2002 | Stenvall |
| 2010/0006355 | A1* | 1/2010 | Smith ..................... B60G 3/20 180/24 |

FOREIGN PATENT DOCUMENTS

| | | |
|---|---|---|
| DE | 3 806 709 | 9/1989 |
| DE | 3 937 606 | 5/1991 |
| DE | 9 106 927 | 7/1991 |
| DE | 9 305 633 | 6/1993 |
| DE | 601 19 217 | 2/2007 |
| EP | 1 985 474 | 10/1986 |
| EP | 0 275 407 | 7/1988 |
| EP | 0 620 132 | 10/1994 |
| EP | 1 122 151 | 8/2001 |
| EP | 1 985 474 | 10/2008 |
| FR | 2 820 089 | 8/2002 |
| GB | 769 391 | 3/1957 |
| JP | 62-012405 | 1/1987 |
| NL | 2 003 566 | 3/2011 |

OTHER PUBLICATIONS

German office action issued in German Application No. 10 2012 205 641.6.

* cited by examiner

HEAVY-DUTY TRAILER WITH MACPHERSON INDEPENDENT WHEEL SUSPENSION

CROSS-REFERENCE TO RELATED APPLICATIONS

The present application is a U.S. National Stage of International Patent Application No. PCT/EP2013/057106 filed Apr. 4, 2013 which published as WO 2013/150099 on Oct. 10, 2013, and claims priority of German Patent Application No. 10 2012 205 641.6 filed Apr. 5, 2012.

BACKGROUND OF THE INVENTION

1. Field of the Invention

The invention concerns a heavy-duty trailer with a plurality of wheels with independent suspensions.

2. Discussion of Background Information

The heavy-duty trailer or as referred to in Annex XI in the EC directive 2007/46/EC as amended from 15 Jul. 2011 the "trailer for heavy load transports", according to the definition provided there, vehicles of the class $0_4$ for the transport of indivisible loads (for example rotor wings of wind power systems), which due to their dimensions are subject to speed and traffic limitations, which also include hydraulic modular trailers, regardless of the number of modules.

Moreover, the wheel suspension of the wheels of a heavy-duty trailer has, for example, a lifting distance of at least 20 cm, preferably at least 25 cm, even more preferred 28 cm, between the maximally compressed state and maximally rebound state, to permit the heavy-duty trailer to drive through depressions without the loading area changing its horizontal alignment. And similarly, when passing through sharp curves, e.g. when driving through a roundabout, or when driving over bumps, the wheels must, through compression, be able to compensate for any unevenness of the surface. Furthermore, according to the invention, all types of trailers come into consideration, i.e. in particular trailers that form articulated trains as well as semitrailers.

A general problem that occurs with heavy-duty trailers with independent wheel suspension is the limited space available to house the components of the independent wheel suspension next to the excavator recess or the central tube of the trailer.

A heavy-duty trailer whose wheels are connected with the trailer frame by means of an independent wheel suspension are, for example, known from EP 1 985 474 A2. In the independent wheel suspension known from this specification, the wheel trunk is connected via an upper triangle transverse control arm and a lower triangle transverse control arm with frame of the trailer. The lower end of the suspension strut is supported by the lower transverse triangle control arm, extends between the two shanks of the upper triangle transverse control arm upwards and its upper end is articulated onto the frame of the heavy-duty trailer. The brake cylinder is positioned in driving direction in front of the wheel mink and in front of the front shaft of the upper triangle transverse control arm. In order to enable the pivoting of the wheel trunk while steering the heavy-duty trailer, the front shaft of the upper triangle transverse control arm was embodied in an offset form. In practice, this embodiment has evidently not been successful, because in the actually realized heavy-duty trailers of the applicant of EP 1 985 474 A2, the brake cylinder has been installed in an oblique downward-directed arrangement, to be able to avoid, even when employing the wheel suspension for a steered wheel, any undesired contact with other wheel suspension components.

SUMMARY OF THE INVENTION

It is therefore the objective of the invention at hand to provide an independent wheel suspension for a heavy-duty trailer where the installation space available for the accommodation of the independent wheel suspension can be advantageously used.

This objective is solved according to the invention through a heavy-duty trailer of the initially specified type, wherein the wheel suspension of at least one of the wheels with independent wheel suspension, preferably all wheels with independent wheel suspension, is a MacPherson wheel suspension. In the MacPherson wheel suspension, the design of which has been known since the end of the 40s of the past century (see U.S. Pat. No. 2,660,449 A), the piston cylinder aggregate simultaneously takes on the function of the wheel trunk. In addition, the upper transverse control arm can be forgone. Thanks to the reduced number of components, the existing components of the wheel suspension can be arranged with more freedom in the limited available installation space.

However, the experts were generally prejudiced against the use of MacPherson wheel suspensions for heavy-duty trailers as, aside from providing a large stroke distance, the wheel suspension must also be capable of withstanding the brake torques (and for driven wheels also the drive torque) that impact the wheel. Since these forces are particularly high in the heavy load sector, the prevalent opinion was that this was not possible with a MacPherson wheel suspension, which provides a stroke distance of at least 20 cm, preferably at last 25 cm, but even more preferably at least 28 cm. It is to the credit of the innovators to have overcome this prejudice. In an analysis of the operating states of heavy-duty trailers, they found out that the maximum rebound state of the wheel suspension, which is particularly liable to wear, only occurs in driving situations in which the heavy-duty trailer is moved at low speed. In these driving situations, the occurring brake torques (or drive torques, respectively) are comparatively low, however, which means that the resulting wear can be tolerated taking into account the low frequency of such driving situations.

In order to further improve the torque absorption, the embodiment of the invention proposes that the cylinder of the piston cylinder aggregate of the MacPherson wheel suspension is to be surrounded by a preferably cylindrical guide tube. In this way the brake and, if required, also the drive torques could be absorbed by the interaction of guide tube and cylinder and would therefore not need to be absorbed by the piston cylinder aggregate. The lower torque absorption by the piston cylinder aggregate reduces the load on the sealing units between the circumferential surface of the piston and the inner surface of the cylinder, on the one hand, and the piston rod and the piston rod outlet end of the cylinder, on the other. This also reduces the so-called stick slip effect that contributes to the wear of piston cylinder aggregates. Moreover, it is beneficial in this context if one end of the guide tube is firmly axially connected with the free end of the piston rod of the piston cylinder aggregate.

To facilitate the relative movement of guide tube and cylinder, it can be provided that at the outer side of the cylinder of the piston cylinder aggregate, preferably at the end where the piston rod exits the cylinder, adjacently, a slide bearing arrangement is provided, which forms a sliding engagement with the interior side of the guide tube or/and that at the interior side of the guide tube, and preferably adjacent to its free end, a slide bearing arrangement is provided which has a sliding engagement with the outer side of the cylinder of the piston cylinder aggregate.

To prevent an uncontrolled relative twisting of cylinder and piston-piston rod unit when operating the heavy-duty trailer, the embodiment of the invention proposes that the free end of the cylinder of the piston cylinder aggregate is articulated in an untwistable manner onto the trailer frame relative to it around the axis of the cylinder, for example, by means of a hinge bolt. Independent from the non-twistable articulation, the articulation of the free end of the cylinder onto the trailer frame is advantageous with respect to the guidance of the cylinder in the guide tube. The end of the piston cylinder aggregate opposite to the free end of the cylinder can, for example, be jointed onto the trailer frame via a transverse control arm, wherein the piston cylinder aggregate is connected to the transverse control arm preferably via a ball joint.

In the embodiment of the invention it is suggested as a further development that the piston cylinder aggregate, preferably the guide tube of the piston cylinder aggregate, has attachment points for the attachment of an assembly group at the wheel trunk, preferably connected to the stub shaft of the wheel trunk, preferably a connection designed in a one-piece form or through an adhesive bond. Generally, at is also conceivable to connect the guide tube of the piston cylinder aggregate to the wheel trunk, preferably to the stub shaft of the wheel trunk, in a one-piece format or through an adhesive bond. Taking into account the construction size of the components required for the independent wheel suspension of heavy-duty trailers, it may be advantageous, in order to simplify the manufacturing and storage of replacement parts, if the guide tube is manufactured as an independent component separate from the assembly group.

In this context, at least one attachment point can include a support plate belonging to the assembly group, on which the piston rod end of the piston cylinder aggregate is placed in an operational state. The piston cylinder aggregate can be, for example, bolted to this support plate, preferably via a plurality of screw connections, which can be evenly distributed on a circular line around the axis of the piston cylinder aggregate. In order to increase the stability of this connection in this context, it is furthermore advantageous, if the support plate forms a receptor pocket together with its assigned edge which receives the piston rod end of the piston cylinder aggregate in a form-fitting manner when the piston cylinder aggregate is in an operational state.

Furthermore, the ball head of a ball joint may, to articulate the piston cylinder aggregate onto a transverse control arm of the wheel suspension, be positioned at the support plate, for example, connected to it, preferably bolted to it.

If the piston cylinder aggregate is encased by a guide tube, the support plate can also take on the function of a connecting plate, which axially firmly connects the free end of the piston rod of the piston cylinder aggregate with the guide tube.

In an axial distance to the support plate relative to the axis of the piston cylinder aggregate, at least one additional connection point can be furthermore provided for the attachment of the piston cylinder aggregate to the assembly group, for example, a screw connection point.

As an alternative to the type of embodiment with the support plate, it is, on principle, also conceivable to connect the piston cylinder aggregate with the assembly group using a plurality of screw connection points, of which at least two have an axial distance from each other relative to the axis of the piston cylinder aggregate. The ball head of a ball joint for the articulation of the piston cylinder aggregate onto a transverse control arm of the wheel suspension can in this case be connected with the piston rod, for example, with screw connections. Furthermore, the piston cylinder aggregate-related parts of the screw connection points can be installed on the guide tube, for example, through welding.

In case of a one-piece connection or adhesively bonded embodiment of guide tube and wheel trunk, the ball bead of the ball joint can be provided for the articulation of the piston cylinder aggregate onto the transverse control arm of the wheel suspension at the guide tube-wheel trunk unit.

In order to enable a compact arrangement of the components of the independent wheel suspension, the embodiment of this invention proposes that the brake cylinder is positioned next to the piston cylinder aggregate, preferably immediately adjacent to it. The arrangement is also considered to be immediately adjacent if the brake cylinder and the piston cylinder aggregate have a distance from each other which ensures that the brake cylinder and the piston cylinder aggregate, when impacted by vibrations during operation, just no longer collide with each other to avoid undesired noise.

A particularly compact arrangement is achieved if the cylinder axes of the brake cylinder and the piston cylinder aggregate are positioned essentially parallel to each other. The mounting of the brake cylinder at the piston cylinder aggregate, for example, at the guide tube, or/and the assembly group is thereby made easier because the bracket to be provided for this is positioned mainly orthogonally to the axis of the piston cylinder aggregate in this case.

In case of an embodiment in a one-piece or bonded connection of guide tube or wheel trunk, the brake cylinder bracket can be provided at the guide tube-wheel trunk unit, preferably at the guide tube.

To be able to minimize the risk of damaging the brake cylinder during operation, it is proposed that the free end of the brake cylinder is to point upward, i.e. away from the running surface.

The brake linkage connecting the brake cylinder with a brake assembly integrated in the wheel trunk consists of a brake lever and brake shaft, wherein the brake lever twists the brake shaft during a pressurization of the brake cylinder by extending its piston rod. In order to design the length of the brake shaft short, so it can fulfill its proper function, the embodiment of the invention proposes to offset the position of the brake cylinder axis in a pre-defined distance relative to the wheel axle, and preferably in driving direction to the front of the heavy-duty trailer. In this context, it should be pointed out that the brake cylinder axis and the wheel axle am mainly positioned orthogonally and skewed to each other, i.e. they do not intersect, wherein the minimum distance of both axes defines the pre-defined distance.

In addition or alternatively, the proper functioning of the brake shaft can also be ensured by providing a support device for the brake shaft connecting the brake cylinder with the brake assembly of the wheel trunk. This support device maybe advantageously positioned at the assembly group or/and the guide tube of the piston cylinder aggregate. In case of a one-piece or adhesively bonded embodiment of guide tube and wheel trunk, this support device can also be provided at the guide tube-wheel trunk unit, preferably at the guide tube.

The steering lever of the wheel suspension can also be embodied at the piston cylinder aggregate, for example, its guide tube or/and at the assembly group. In case of a one-piece or adhesively bonded embodiment of guide tube and wheel trunk, the steering lever can also be provided at the guide tube-wheel trunk unit, preferably at the guide tube.

It must be pointed out here that the components of the assembly group comprising the stub shaft, namely in addition to the assembly group also the support plate for the piston cylinder aggregate or/and the at least one additional attachment point for the piston cylinder aggregate or/and the bracket for the brake cylinder or/and the support for the brake shaft or/and the steering lever, can be formed in one piece, for example, thus as a casting part or forged part. It is, however, also possible to manufacture at least one of these components as a casting part or/and to manufacture at least one of these components as a forged part or/and at least one of these components as a sheet metal part, preferably steel, for example, by way of die cutting or/and cutting or/and bending, wherein these components are subsequently connected with or to the structural unit through adhesive bonding, for example through welding. The same applies in case of a one-piece design or an adhesively bonded connection of guide tube and wheel trunk.

In the embodiment of the invention it is proposed as a further development that at least one wheel of the heavy-duty trailer shall be a steered wheel. To ensure in this case that the brake cylinder does not collide with another component of the wheel suspension in any steering position of the wheel, it is proposed to arrange the components of the wheel suspension such that, when viewed as a projection in the longitudinal direction the trailer, the projection surface of the brake cylinder does not overlap with the projection surfaces of the transverse control arm and the steering rod, or/and that when viewed as a vertical projection, the projection surface of the assembly group comprising the piston rod of the brake cylinder and the brake linkage does not overlap the projection surface of the steering rod in any steering position of the wheel.

The at least one wheel can also be an actuated wheel. In this context, the use of an individual wheel drive which may, for example, comprise an electric motor or/and a hydro motor, is of advantage with respect to the above described installation space issue.

An additional problem that can occur with heavy-duty trailers due to the large stroke distance is a wheel track expansion due to the compression and rebound. To be able to reduce this effect, the invention proposes to position the articulating axis of the transverse control arm of the wheel suspension at the trailer frame below an excavator recess or central tube.

If adhering to traditional construction approaches, an attempt will be made in the embodiment of this construction specification to position the articulating axis of the transverse control arm on the trailer frame as close as possible to the longitudinal center plane of the trailer, as is known, for example, from EP 1 985 474 A2. The inventors of the present invention, however, have deviated from this traditional approach and propose to position the articulating axes of the transverse control arms at the trailer frame at least in the longitudinal center plane of the trailer, preferable even on the side opposite to the assigned wheel of the longitudinal center plane. As this idea is advantageous regardless of the wheel suspension design as a MacPherson wheel suspension design, a separate protection is sought for this idea.

If the transverse control arms of two wheels positioned opposite each other in lateral trailer direction are both designed as triangular transverse control arms, the articulating axes of the free ends of the triangular transverse control arm shafts can be positioned in a manner that respectively one of the shafts of the two triangular transverse control arms engages with its free end between the two shafts of the respective other triangular transverse control arm. One the one hand, this presupposes triangular transverse control arms that are differently designed for opposite wheels, but on the other, it provides an opportunity to increase the shaft length of the triangular transverse control arms to the longitudinal center plane of the trailer or even beyond that. This not only reduces the wheel track change in connection with the compression and rebound, but also the related change of the camber inclination.

The articulation axes of the two triangular transverse control arms can, for example, all be arranged in the longitudinal center plane of the trailer, wherein preferably two of the articulation axes are combined to a joint articulation axis. In order to increase the transverse control arm length it is alternatively also possible that the articulation axes of each of the two triangular transverse control arms are arranged on the opposite side of the longitudinal center plane of the trailer to the related wheel, preferably the opposite edge adjacent to the excavator recess. To increase the ground clearance both in a compressed as well as rebound state, it can be provided that the shafts of the transverse control arms are designed in a bent form, wherein the concave side of the bend faces the running surface when operational.

In the embodiment of the invention it is proposed that the steering cylinders of the heavy-duty trailer steering gear include an angle different from zero relative to the longitudinal direction of the trailer, wherein its value is preferably between 10° and approximately 70°, but most preferably between 35° and approximately 55°. This will very much simplify the provision of the installation space required for the articulation of the transverse control arms onto the heavy-duty trailer frame. As this idea is advantageous regardless of the wheel suspension design as a MacPherson wheel suspension design, a separate protection is sought for this idea.

BRIEF DESCRIPTION OF THE DRAWINGS

The invention will be described in more detail in the following using implementation examples based on the attached drawing. Wherein.

DETAILED DESCRIPTION OF THE INVENTION

Figure 1:
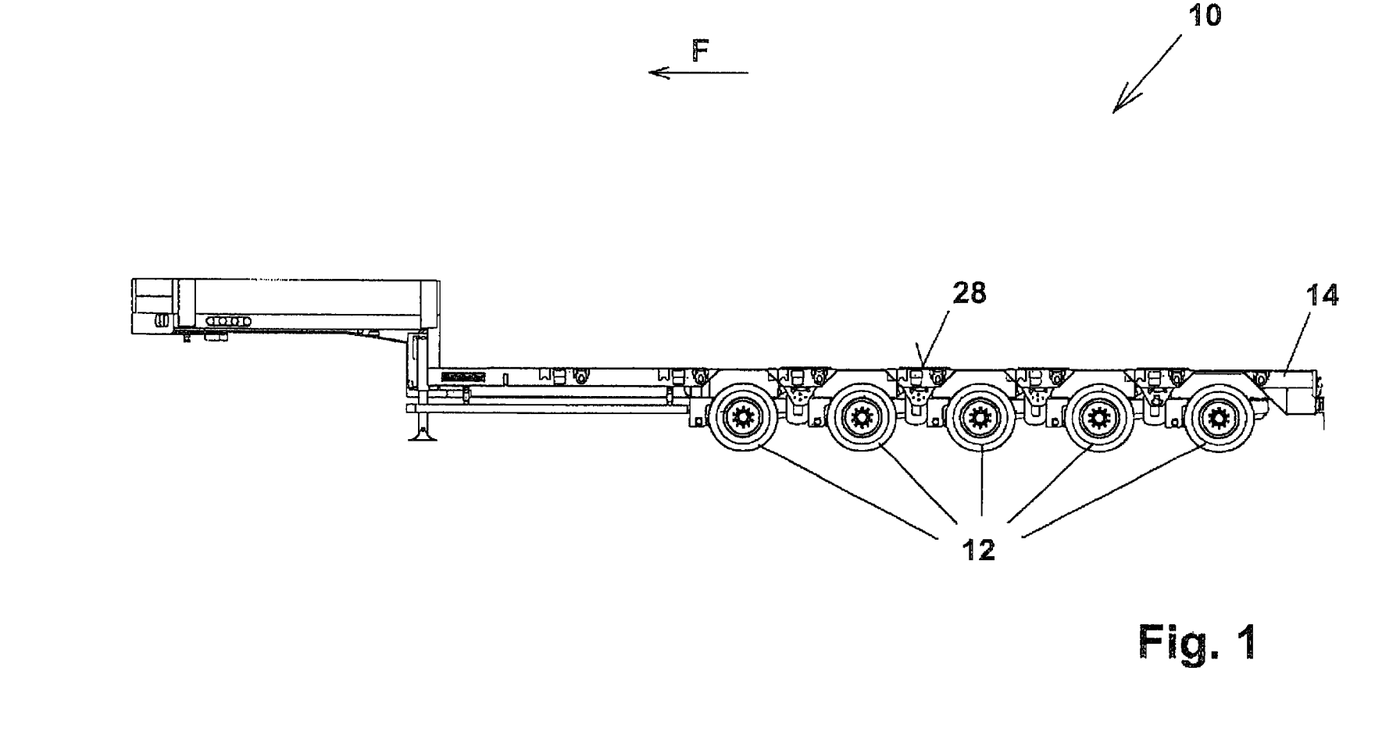
FIG. 1 shows a side view of a heavy-duty trailer in which, according to the invention, the MacPherson independent wheel suspension can be used.

In FIG. 1, a heavy-duty trailer design according to the invention is generally designated as 10. According to the invention, at least one of the wheels 12 of the heavy-duty trailer is equipped with an independent wheel suspension in MacPherson design, which will be explained in detail in the following. At this point it should be pointed out that the heavy-duty trailer 10 in accordance with FIG. 1 is shown merely as example as semitrailer in form of a flat-bed trailer, and that the present invention maybe embodied in the same manner also in a semitrailer with flatbed or drop-deck design, with a drawbar trailer, or in a heavy-duty trailer with modular design, and this regardless of whether the respective wheel 12 is non-steered or steered or is an actuated wheel or a drawn wheel.

Figure 2:
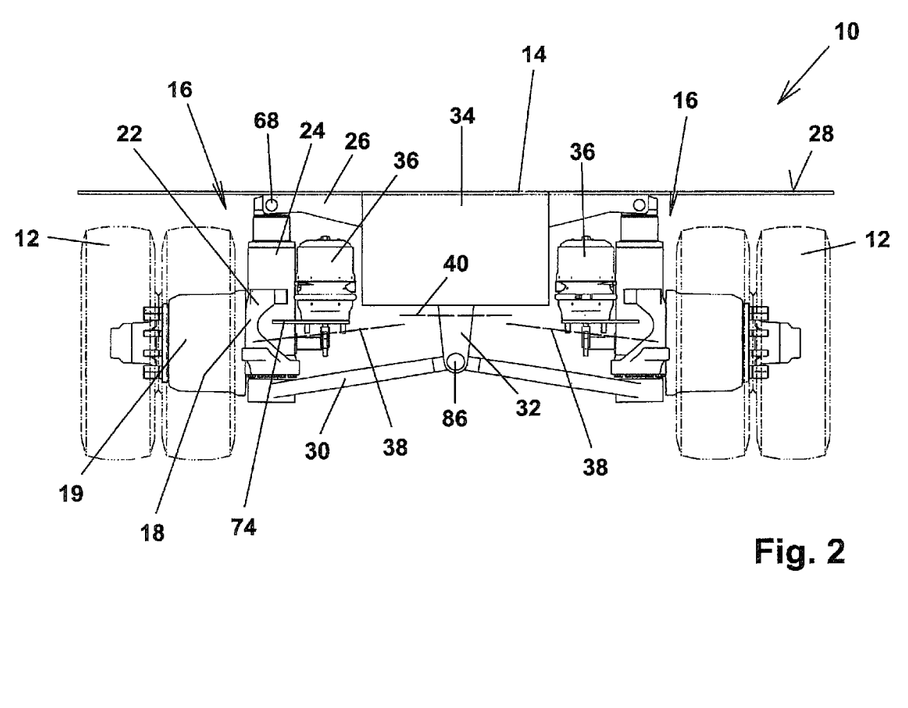
FIG. 2 shows a sectional view orthogonal to the longitudinal trailer direction to illustrate the independent wheel suspension according to the invention.

FIG. 2 shows both wheels 12 of one of the axles of the heavy-duty trailer 10. Both wheels 12 are connected via the independent wheel suspension 16 with the frame 14 of the heavy-duty trailer 10. Every independent wheel suspension 16 comprises a wheel trunk 18, its stub shaft 20 (see for example FIG. 3) connected via an assembly group 22 with a piston cylinder aggregate 24. The piston cylinder aggregate 24 is articulated onto one end at braces 26 of the frame 14 of the heavy-duty trailer 10, which are positioned below the loading area 28 of the heavy-duty trailer 10, and at the other end via the triangular transverse control arms 30 onto the frame part 32, which extends downward from the excavator recess 34 or the central tube of the heavy-duty trailer 10. Furthermore, the independent wheel suspension 16 also comprises a brake cylinder 36 which is connected a with brake assembly 19. Only roughly schematically indicated with a dashed line is steering rod 38, via which the independent wheel suspensions 16 are connected with the frame 14 of the heavy-duty trailer 10, or in case of steered wheels 12 in FIG. 2 with a merely roughly schematically indicated steering gear 40 of the heavy-duty trailer 10.

Figure 3:
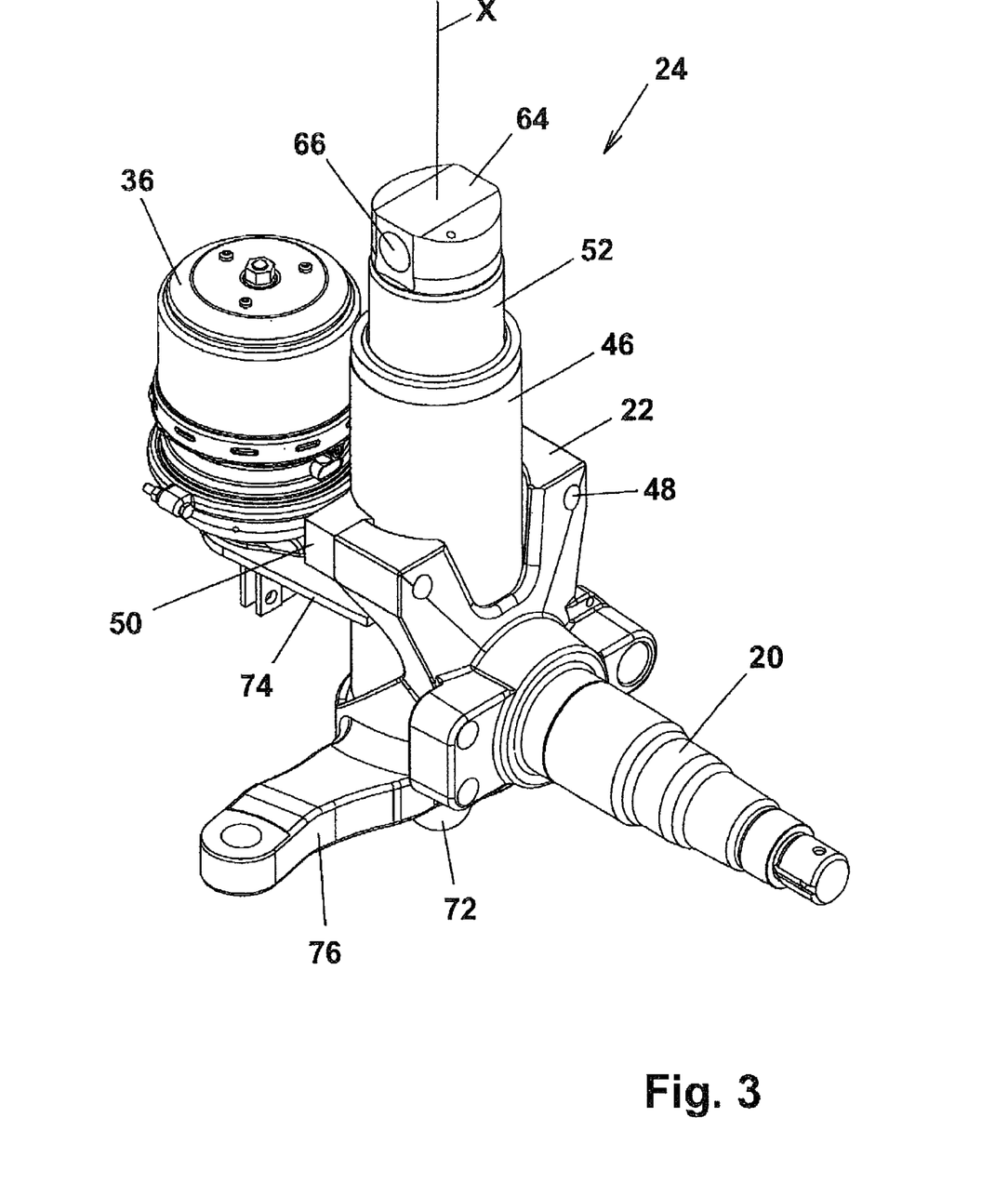
FIG. 3 shows a perspective view of a first embodiment of the main components of the independent wheel suspension according to the invention.
Figure 4:
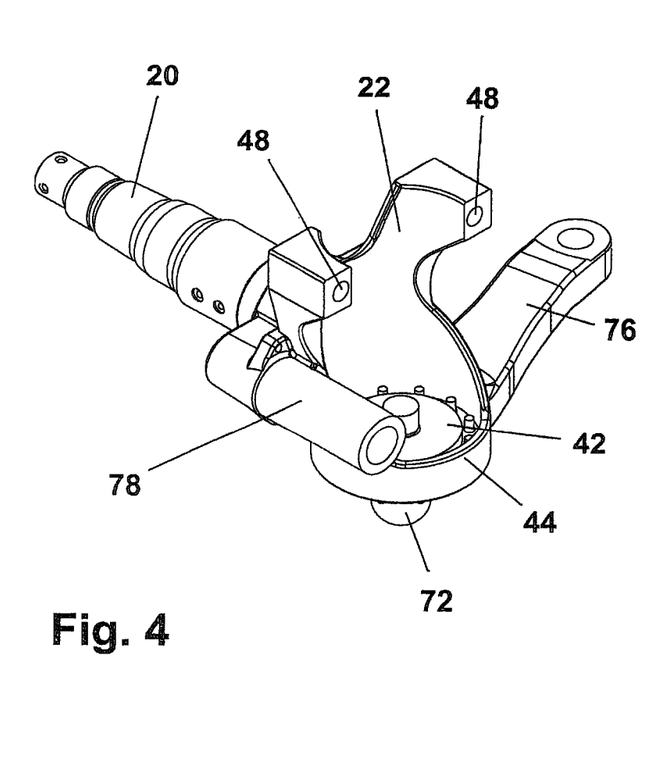
FIG. 4 shows a perspective view of the stub shaft and its assigned assembly group in accordance with the first embodiment.
Figure 5:
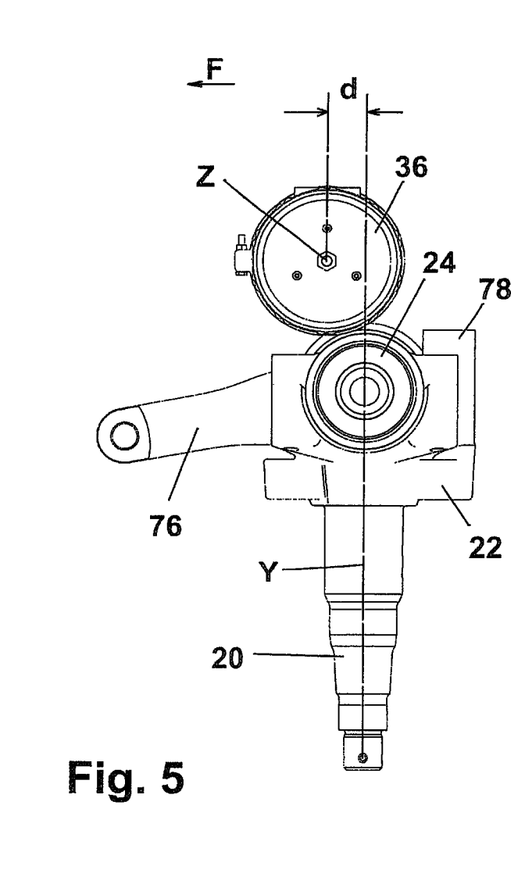
FIG. 5 shows a top view of the main components shown in FIG. 3 of the independent wheel suspension according to the invention.

In reference to FIGS. 3 to 7, the design of the independent wheel suspension 16 is to be explained in more detail:

In FIGS. 3 to 5, the stub shaft 20 of the wheel trunk 18 is recognizable, which is connected to assembly group 22 through an adhesive bond. Assembly group 22 comprises a support plate 42 for the piston cylinder aggregate 24, which is framed by an upward pointing edge 44 such that the piston cylinder aggregate 24 is held in the thus constituted bracket in a form-fitting manner. According to FIG. 6, the support plate 42 is bolted to a subsequently in more detail explained guide tube 46 of the piston cylinder aggregate 24. In addition, assembly group 22 has two more connection points 48 with respect to cylinder axis X of the piston cylinder aggregate 24 in an axial distance to support plate 42, which can be connected to the associated connection lugs 50 of the guide tube 46 (not visible due to the location of the cross-sectional plane in FIG. 6), for example by way of a screw connection. In this way, the piston cylinder aggregate 24 can be connected securely and reliably with the assembly group 22.

Figure 6:
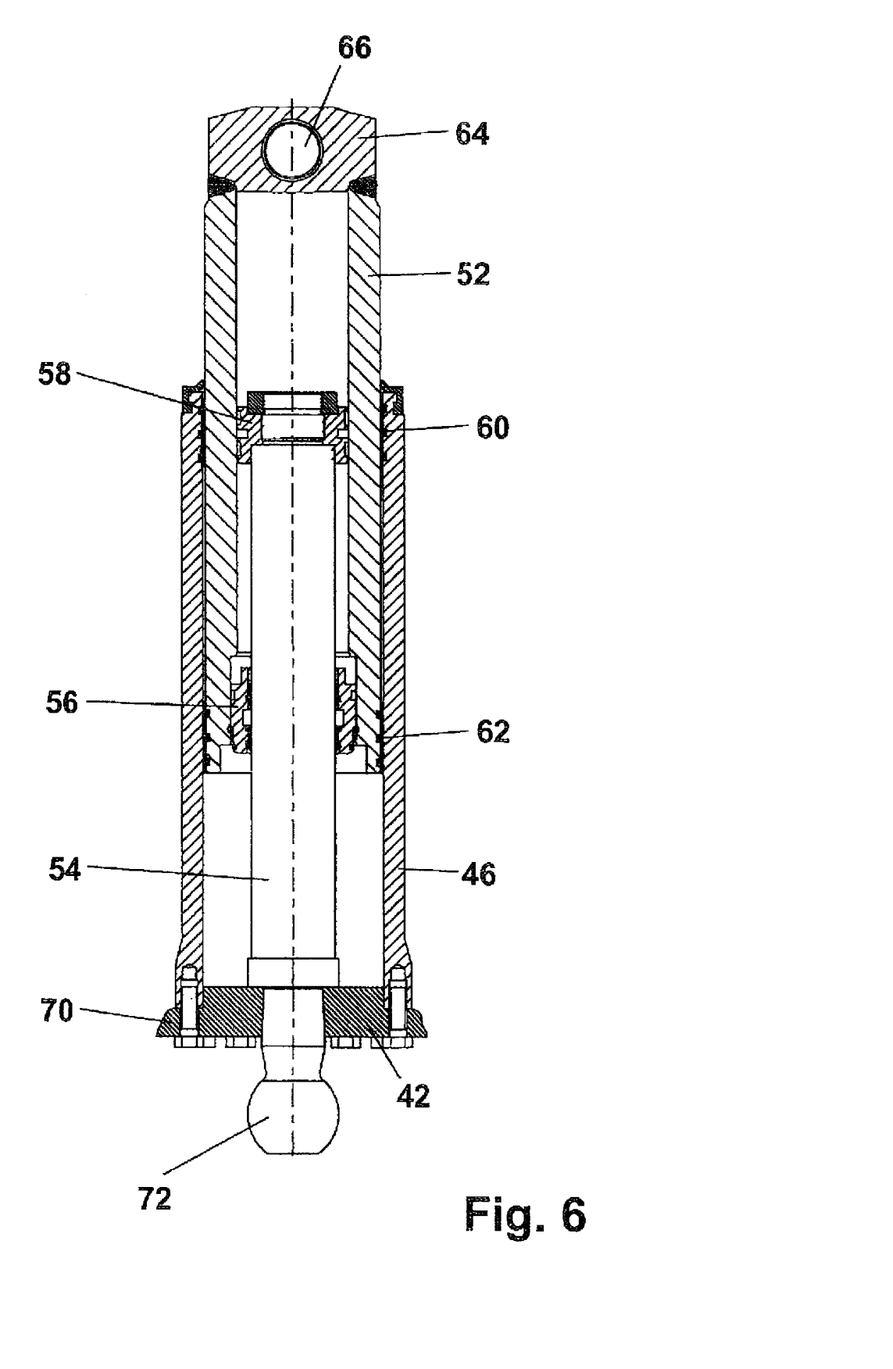
FIG. 6 shows a cross-sectional view of the piston cylinder aggregate of the first embodiment.

The as a hydraulic damper designed piston cylinder aggregate 24 comprises, according to FIG. 6, aside from the guide tube 46 also a cylinder 52, a piston rod 54, which extends out of one end of cylinder 52 with the help of a sealing and guiding unit 56, which is positioned there, and a piston 58, which is fastened to the end of the piston rod 54 positioned in the interior of cylinder 52.

Piston rod 54 is reliably connected with guide tube 46 via support plate 42 in such a manner that the guide tube 46 also moves relative to the cylinder 52 when the piston rod 54 moves relative to cylinder 52. To make these relative movements between the guide tube 46 and cylinder 52 possible, two slide bearing assembly groups 60 and 62 are provided. As the slide bearing assembly groups 60 and 62 have no other functions to fulfill, they can be designed robustly enough that they can take over the function of supporting braking and, if necessary, also driving torques. This support therefore needs not be assumed by the seals of the sealing and guiding unit 56 and piston 58.

The free end 64 of cylinder 52 can be embodied with a through-hole 66, which can be penetrated by a hinge bolt 68 (see FIG. 2) for the purpose of a non-twistable articulation with respect to the frame 14 onto the frame braces 26. Generally, other types of articulation are also conceivable. At its opposite end 70, the piston cylinder aggregate 24 is connected to a ball stud 72 for the articulation onto the transverse control arm 30. In particular, the shaft of the ball stud 72 can penetrate the support plate 42 and be bolted to the piston rod 54.

In the shown embodiment, a mounting panel 74 for the brake cylinder 36 is furthermore connected, for example through welding, with guide tube 46 of the piston cylinder aggregate 24. In addition, the assembly group 22 contains a steering lever 76 with which the steering rod 38 engages, as well as a support device 78 for the brake shaft (according to brake shaft 80' of the variation in accordance with FIG. 9) of the brake assembly 19.

To be able to design the brake shaft as short as possible, the brake cylinder 36 is not placed exactly on the opposite side from the stub shaft 20 of the piston cylinder aggregate 24, but instead in driving direction F of the heavy-duty trailer 10 placed slightly forward. In particular, the axis Y of the stub shaft 20 and the axis Z of the brake cylinder 36 have, in accordance with FIG. 5, a pre-defined distance d from each other. Furthermore, it must be pointed out that brake cylinder 36 is positioned practically flush to the guide tube 46, and to be more exact, it has a distance from it that is only large enough to ensure during the operation of the heavy-duty trailer 10 that these two parts do not collide with one another, which, aside from an undesired noise that is created, could also lead to these parts being damaged.

Figure 7:
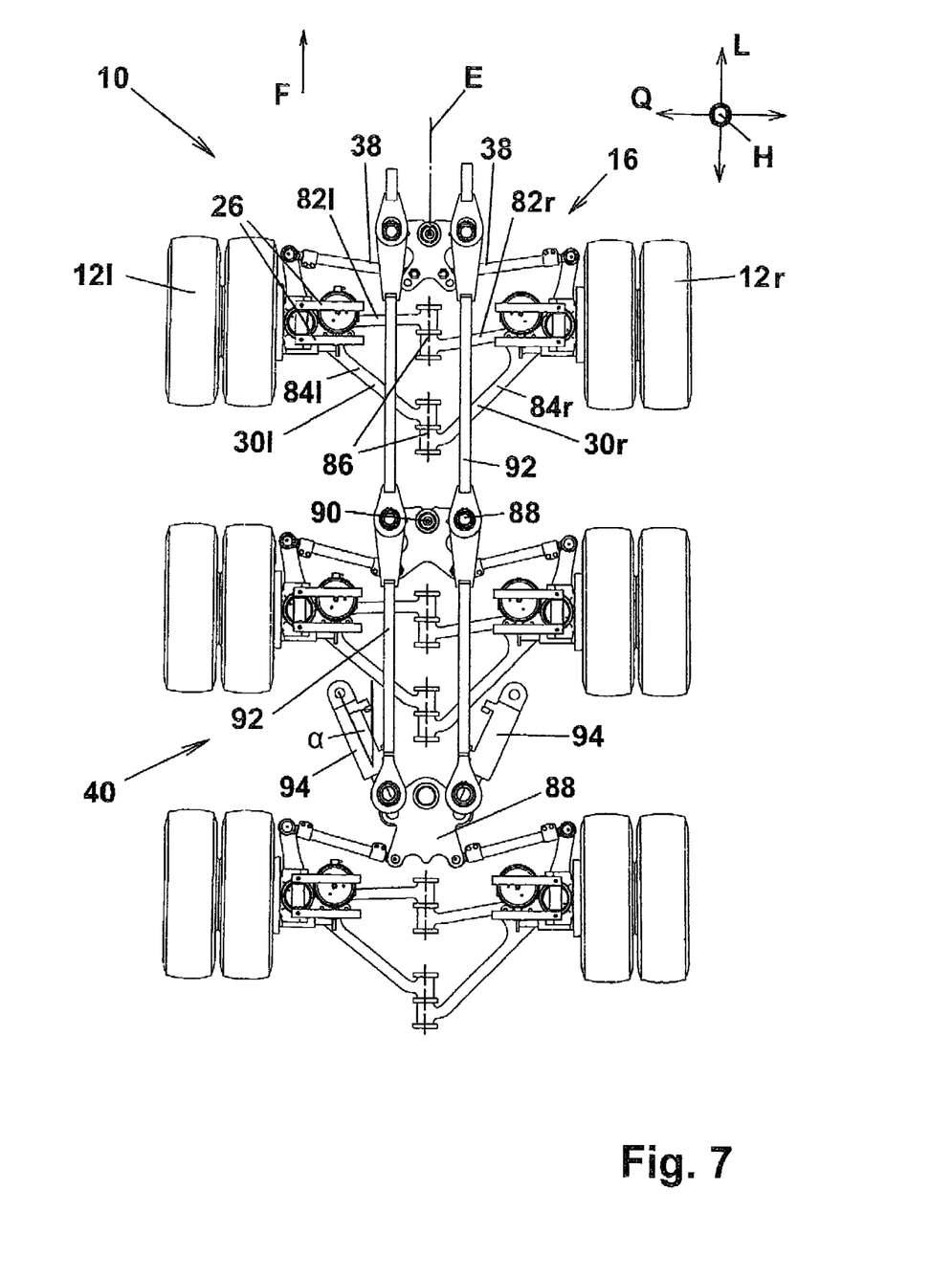
FIG. 7 shows a top view on the chassis and the steering gear of the heavy-duty trailer, the wheels of which are provided with an independent wheel suspension according to the invention in the first embodiment, to explain the steering of the heavy-duty trailer.

FIG. 7 shows a top view of the chassis and the steering of the heavy-duty trailer 10, in which, to simplify understanding of the drawing, only those components are shown that are required for the explanation of the embodiment of the triangular transverse control arms 30 and the steering gear 40.

As is recognizable in FIG. 7, the triangular transverse control arms 30*l* and 30*r* are not designed identical for the left or right wheels 12, respectively, and instead in such a manner that of the two shafts 82*l*, 84*l* and 82*r*, 84*r* of the transverse control arms 30*l*, 30*r*, the free end of one of these shafts, respectively, namely the free end of the shafts 82*r* or 84*l* engages between the two shafts 82*l*, 84*l* or 82*r*, 84*r*, respectively, of the respective other triangular transverse control arm 30*l* or 30*r*. In the embodiment according to FIG. 7, the transverse control arms 30*l*, 30*r* thereby extend in lateral direction Q of the heavy-duty trailer 10 up to precisely the longitudinal center plane E of the heavy-duty trailer 10. At this point, the bearing bushings arranged at the free ends of shafts 82*l*, 84*l*, 82*r*, 84*r* are positioned in pairs over a common bearing bolt 86 (see also FIG. 2) at the frame parts 32. This way, the transverse control arms 30 can be designed longer than, for example, known from EP 1 985 474 A2. This has an advantageous impact on the change of the wheel track as well as the camber inclination during the compression and rebound of the wheels 12.

Figure 8:
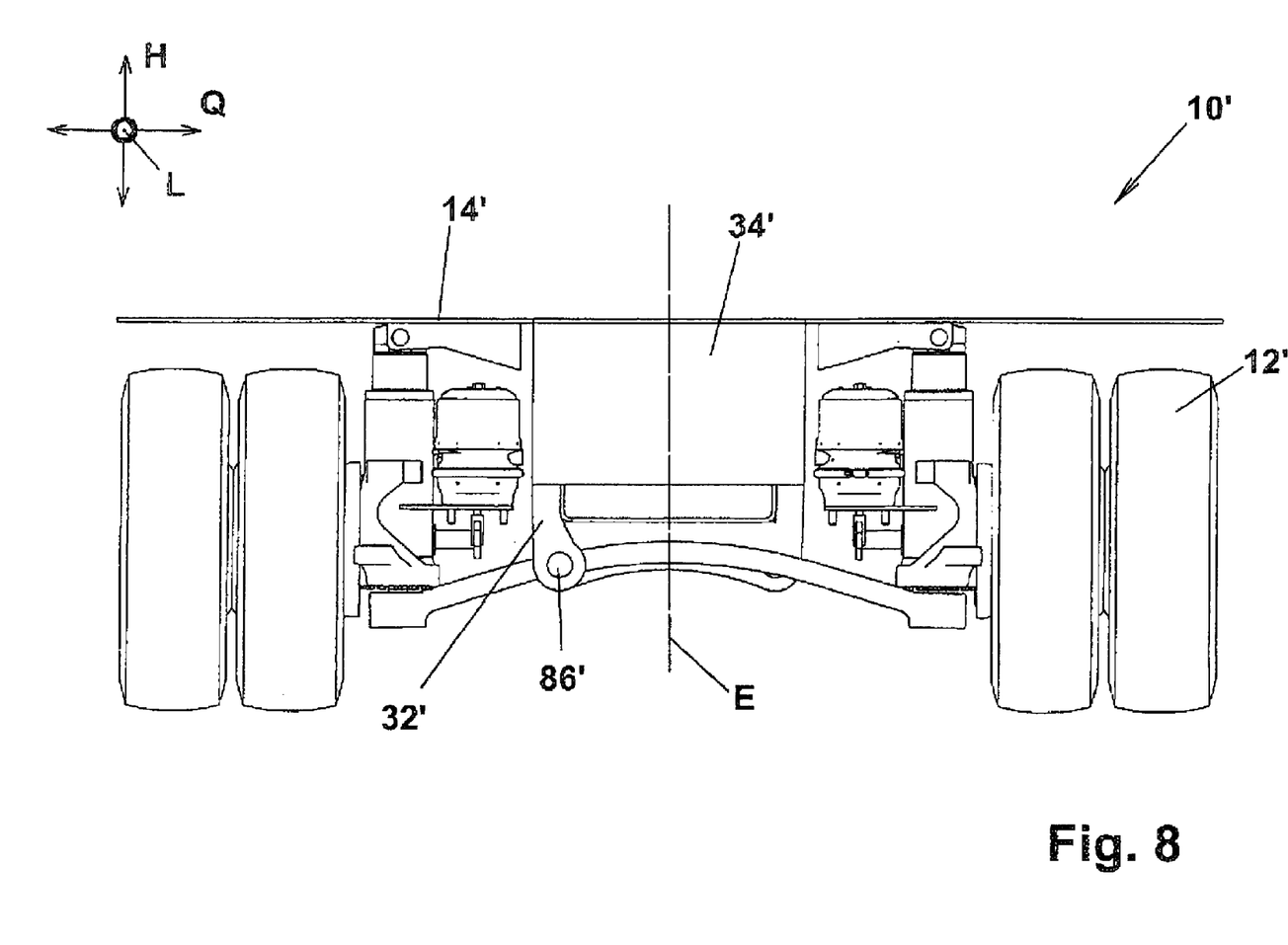
FIG. 8 shows a view similar to FIG. 2 to explain a variation to the first embodiment.
Figure 9:
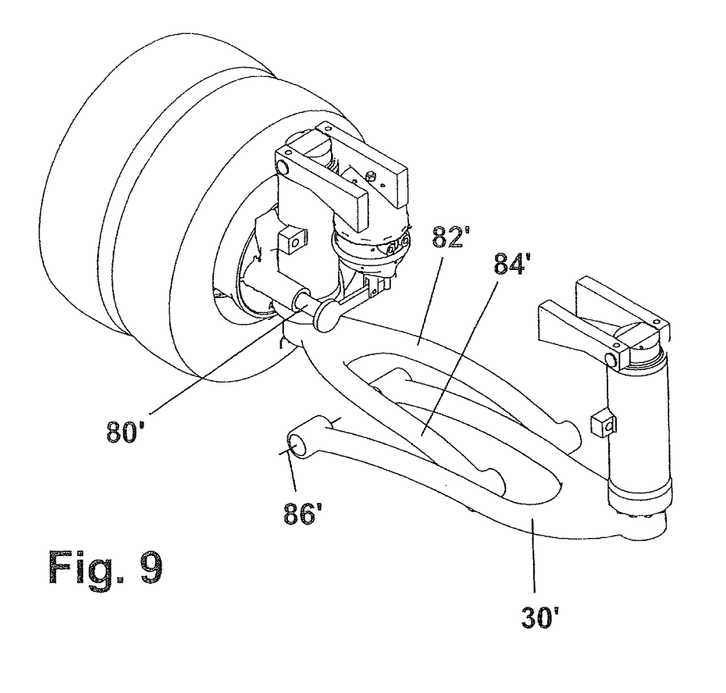
FIG. 9 shows a perspective view to explain essential details of the invention in the variation to the first embodiment.
Figure 10:
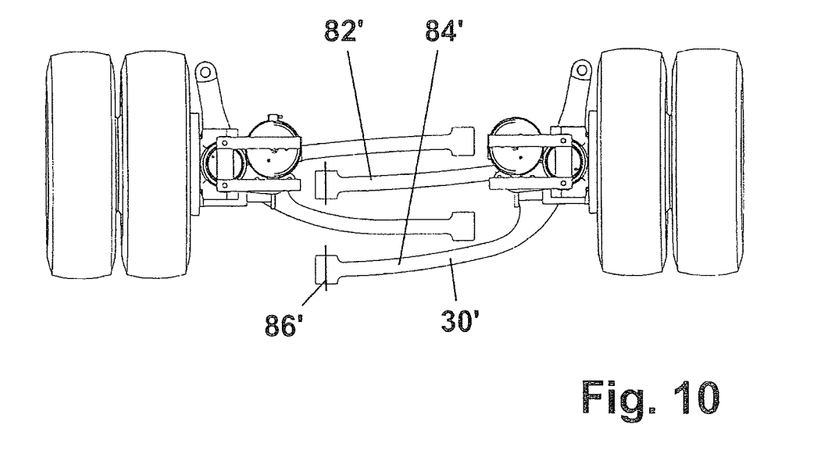
FIG. 10 shows a bottom view under the heavy-duty trailer according to the invention to explain essential details of the invention in the variation to the first embodiment.

In variation of the first embodiment, FIGS. 8 to 10 show that the transverse control arms 30' can be designed even longer, if they extend from their assigned wheel 12' even beyond the longitudinal center\ plane of the heavy-duty trailer 10', in particular preferably to the opposite edge of the excavator recess 34', and are only there articulated with bearing bolts 86' onto the frame parts 32' of the frame 14' of the heavy-duty trailer 10'. With this variation, it is possible to further reduce the change of the wheel track and the camber inclination when the wheels 12' compress and rebound.

In order to ensure a large ground clearance during every compression and rebounding of the wheels 12' despite the great length of the transverse control arms 30', the shafts 82', 84' of the transverse control arms 30' are designed in a bent form such that the concave side of the bend points downward in height direction H of the heavy-duty trailer 10'.

Again with reference to FIG. 7, the steering unit 40 of the heavy-duty trailer 10 shall now be explained:

At the frame 14 of the heavy-duty trailer 10, the pivot plates 88 are attached in a manner to allow a pivoting movement respectively around a pivotal axis 90 in height direction H, which is preferably arranged on the longitudinal center plane E of the heavy-duty trailer 10. Each of the pivot plates 88 is assigned to two, in lateral direction Q of the heavy-duty trailer 10, opposite each other positioned wheels 12 and connected with their wheel suspensions 16 via the steering rods 38. In addition, in longitudinal direction L of the heavy-duty trailer 10, the pivot plates 88 positioned next to each other are connected with two primarily in longitudinal direction L positioned connecting rods 92. The two connecting rods 92 are thereby articulated to the left or right, respectively, of the longitudinal center plane E in a prodefined distance from the pivotal axes 90 onto the pivot plates 88. Two steering cylinders 94 are connected with the, in FIG. 7, lowest pivot plate 88 to pivot this pivot plate 88 clockwise or counter clockwise. This pivoting movement is transmitted via connecting rods 92 also to the other pivot plates 88 and from there continue via steering rods 38 to the wheels 12. In this context, it is possible, through appropriate selection of the articulating points of the steering rods 38 to the pivot plates 88, to choose a different pivot angle to steering angle transmission ratio for every wheel pair.

According to the invention, the steering cylinders are not positioned in the longitudinal direction L of the heavy-duty trailer 10, but instead relative to it in an angle α.

Through this, it is possible to provide sufficient installation space for the connection of the free shafts of the transverse control arms 30 to the frame 14 of the heavy-duty trailer 10.

Figure 11:
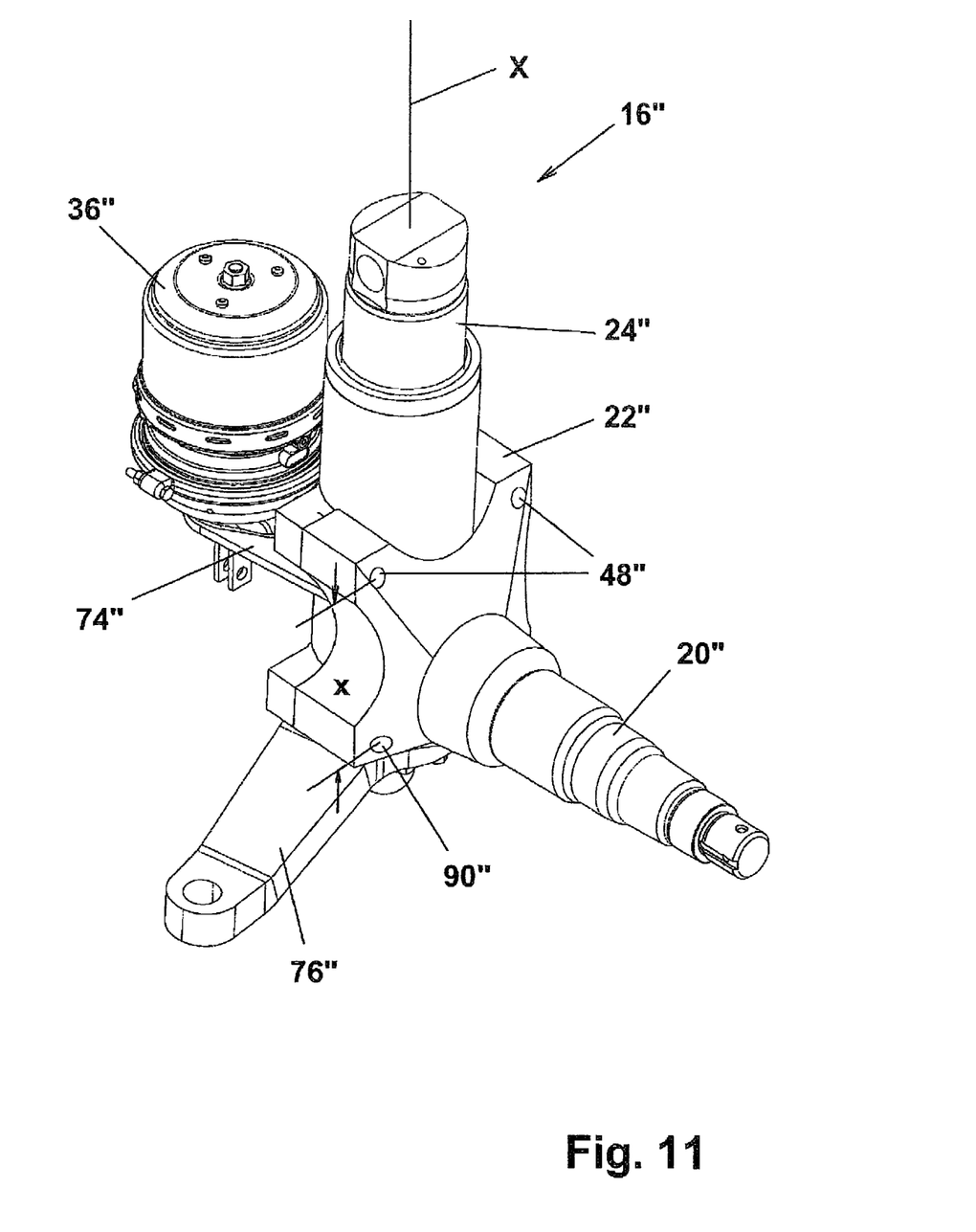
FIG. 11 shows a perspective view of a second embodiment of the main components of the independent wheel suspension according to the invention.
Figure 12:
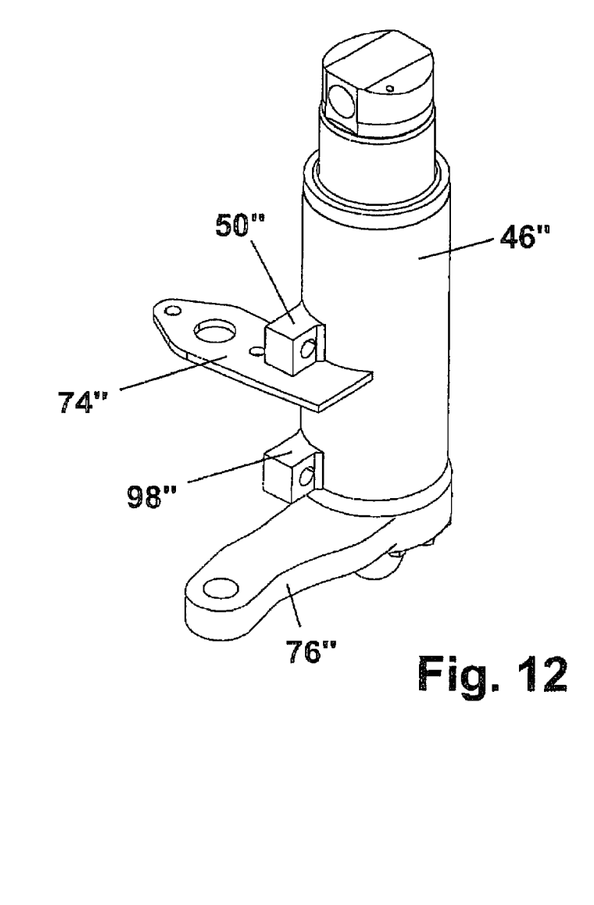
FIG. 12 shows a perspective view of the piston cylinder aggregate of the second embodiment.
Figure 13:
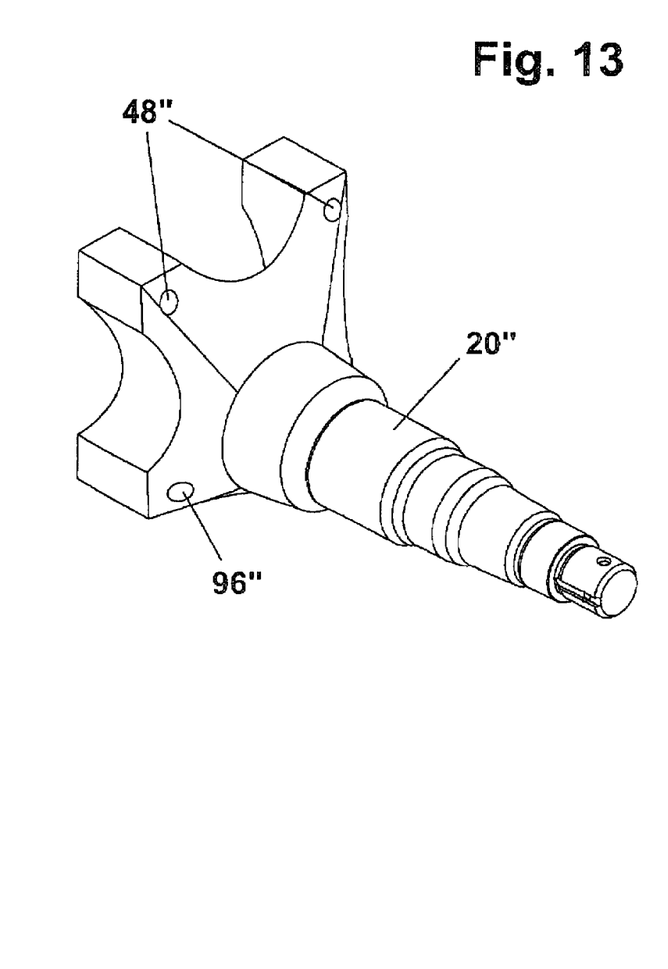
FIG. 13 shows a perspective view of the stub shaft and its assigned assembly group in accordance with the second embodiment.

In FIGS. 11 to 13, a second embodiment of the invention at hand is presented. The second embodiment according to FIGS. 11 to 13 essentially corresponds to the first embodiment in accordance with FIGS. 3 to 6. Therefore, in FIGS. 1 to 13, analogous parts are indicated with the same reference numbers as in FIGS. 3 to 6, but in addition are marked with a """". In addition, the embodiment of FIGS. 11 to 13 is only described to the degree it is different from the embodiment according to FIGS. 3 to 6, the description of which is explicitly referenced here.

FIG. 11 shows the total of the main components of the independent wheel suspension 16" according to the invention in accordance with the second embodiment min a perspective view corresponding to FIG. 3, whereas FIG. 12 shows the piston cylinder aggregate 24" and FIG. 13 the stub shaft 20" including the assembly group 22" also in a perspective view.

On the one hand, the independent wheel suspension 16" is different from the independent wheel suspension 16 for lack of the support plate 42. In replacement of the support plate 42, the assembly group 22" comprises two connection points 96" which, similar to connection points 48", are preferably designed as screw connection points, to which connection points 48" have, in reference to the cylinder axis X of the piston cylinder aggregate 24", however, an axial distance x. Accordingly, at the guide tube 46" of the piston cylinder aggregate 24", not only the connection lugs 50" assigned to the connecting points 48" are provided but in addition also the connection lugs 98" assigned to the connection points 96".

On the other hand, the independent wheel suspension 16" is different from the independent wheel suspension 16 because the steering lever 76" is not connected to assembly group 22", but instead with guide tube 46" of the piston cylinder aggregate 24" in an adhesive bond.

Figure 14:
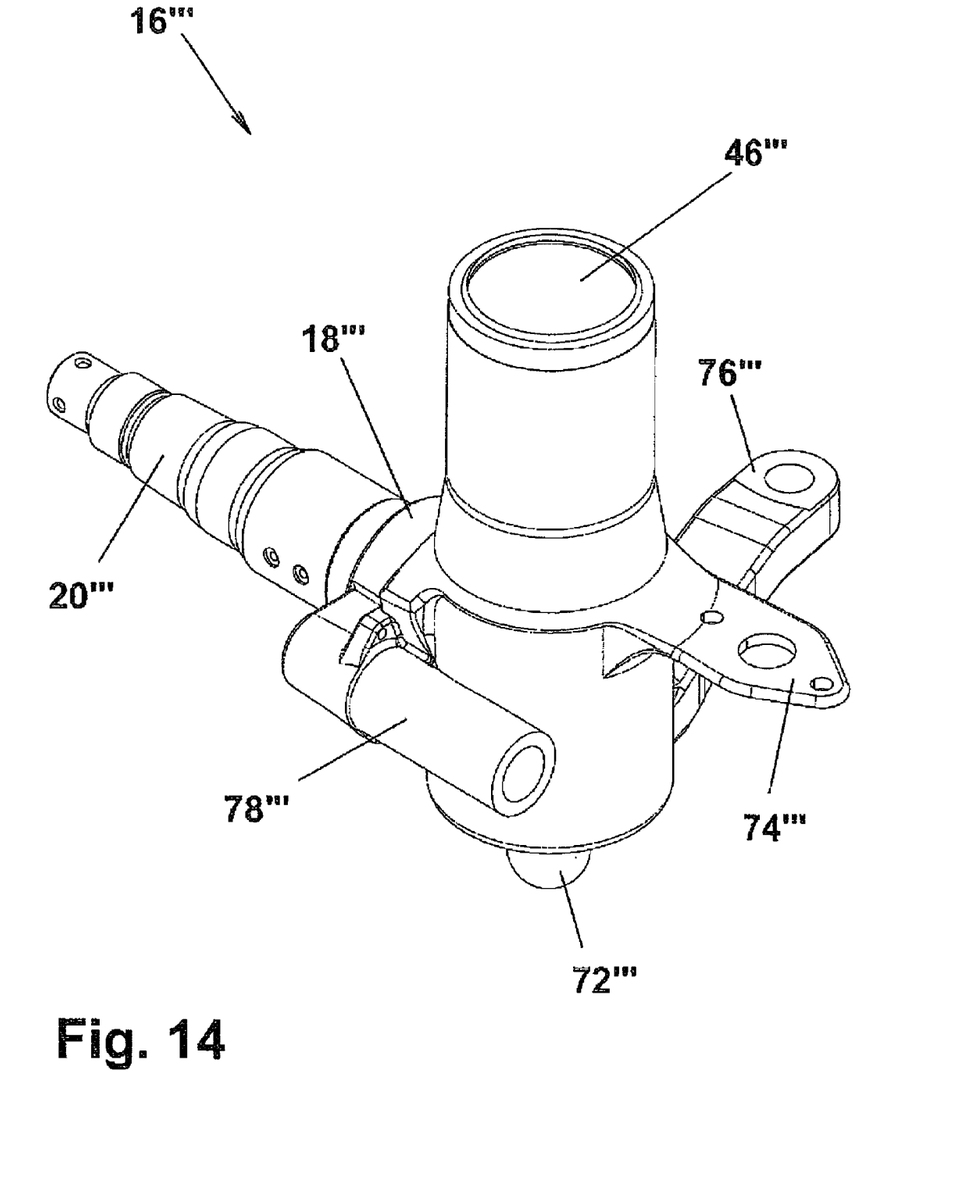
FIG. 14 shows a perspective view of a third embodiment of the independent wheel suspension according to the invention.

FIG. 14 is a third embodiment of the invention at hand, which essentially corresponds to the first embodiment in accordance with FIGS. 3 to 6. Therefore, in FIG. 14, analogous parts are indicated with the same reference numbers as in FIGS. 3 to 6, but in addition are marked with a """"". In addition, the embodiment of FIG. 14 is only described to the degree as it is different from the embodiment according to FIGS. 3 to 6, the description of which is explicitly referenced here.

The independent wheel suspension 16"" is different from the independent wheel suspension 16 because the wheel trunk 18"" and in particular its shaft stub 20"" is designed in a one-piece format or connected in an adhesive bond with guide tube 46"" of the piston cylinder aggregate, for example, by way of welding. Also, the other parts arranged on this assembly, namely the mounting panel 74"" for the brake cylinder, the steering lever 76"" and the support device 78"" for the brake shaft are preferably embodied in one piece with it or adhesively bonded, for example, through welding. The ball stud 72"" for the articulation of the transverse control arm can, for example, be connected with this assembly group through a screw connection.

Item 1: Heavy-duty trailer with a plurality of wheels with independent wheel suspension, characterized in that the wheel suspension of at least one of the wheels, preferably all of the wheels, with independent wheel suspension is a MacPherson wheel suspension.

Item 2: Heavy-duty trailer according to Item 1, characterized in that the cylinder of the piston cylinder aggregate of the MacPherson wheel suspension is encircled by a, preferably cylindrical, guide tube.

Item 3: Heavy-duty trailer according to Item 2, characterized in that the one end of the guide tube is firmly axially connected with the free end of the piston rod of the piston cylinder aggregate.

Item 4: Heavy-duty trailer according to Items 2 or 3, characterized in that at the outer side of the cylinder of the piston cylinder aggregate, and preferably adjacent to the end where the piston rod exits the cylinder, a slide bearing arrangement is provided, which forms a sliding engagement with the interior aide of the guide tube or/and that at the interior side of the guide tube, and preferably adjacent to its free end, a slide bearing arrangement is provided, which has a sliding engagement with the outer side of the cylinder of the piston cylinder aggregate.

Item 5: Heavy-duty trailer according to one of the Items 1 to 4, characterized in that the free end of the cylinder of the piston cylinder aggregate is articulated onto the trailer frame relative to it around the axis of the cylinder in a non-twistable manner, for example, with a hinge bolt.

Item 6: Heavy-duty trailer according to one of the Items 1 to 5, characterized in that the guide tube of the piston cylinder aggregate is connected with the wheel trunk, preferably with the stub shaft of the wheel trunk, in a one-piece format or through an adhesive bond.

Item 7: Heavy-duty trailer according to one of the Items 1 to 5 characterized in that the piston cylinder aggregate, preferably the guide tube of the piston cylinder aggregate, has attachment points for attachment to an assembly group, preferably in a one-piece format with or adhesively connected to the wheel trunk, preferably the stub shaft of the wheel trunk.

Item 8: Heavy-duty trailer according to Item 7, characterized in that at least one attachment point can include a support plate belonging to the assembly group, on which the piston rod end of the piston cylinder aggregate sits in an operational state.

Item 9: Heavy-duty trailer according to Item 8, characterized in that the support plate together with an edge assigned to it forms a bracket which receives the piston rod end of the piston cylinder aggregate in a form-fitting manner when the piston cylinder aggregate is in an operational state.

Item 10: Heavy-duty trailer according to Items 8 or 9 characterized in that the ball head of a ball joint is arranged at the support plate for the articulation of the piston cylinder aggregate onto a transverse control arm of the wheel suspension.

Item 11: Heavy-duty trailer according to one of the Items 8 to 10, provided that these indirectly or directly back-reference Item 3, characterized in that the support plate also takes on the function of a connecting plate which connects the free end of the piston rod of the piston cylinder aggregate firmly axially with the guide tube.

Item 12: Heavy-duty trailer according to one of the Items 8 to 11, characterized in that, in an axial distance to the support plate, at least one additional attachment point is provided for the attachment of the piston cylinder aggregate at the assembly group.

Item 13: Heavy-duty trailer according to Item 7, characterized in that the piston cylinder aggregate is connected with the assembly group through a plurality of screw connection points of which at least two have an axial distance from each other.

Item 14: Heavy-duty trailer according to one of the Items 1 to 13, further characterized in that the wheel suspension has a brake cylinder.

Item 15: Heavy-duty trailer according to Item 14, characterized in that the brake cylinder of the wheel suspension is arranged next to the piston cylinder aggregate, preferably directly adjacent to it.

Item 16: Heavy-duty trailer according to Items 14 or 15, characterized in that the cylinder axes of the brake cylinder and the piston cylinder aggregate are essentially parallel to each other.

Item 17: Heavy-duty trailer according to one of the Items 14 to 16, characterized in that the free end of the brake cylinder points upward.

Item 18: Heavy-duty trailer according to one of the Items 14 to 17, characterized in that the axis of the brake cylinder is offset relative to the wheel axle by a pre-defined distance, and preferably in driving direction of the heavy-duty trailer to the front.

Item 19: Heavy-duty trailer according to one of the Items 14 to 18 characterized in that a support device is provided for a brake shaft connecting the brake cylinder with the brake assembly of the wheel trunk, which is arranged, for example, at the assembly group or/and the guide tube of the piston cylinder aggregate.

Item 20: Heavy-duty trailer according to one of the Items 14 to 19, characterized in that a bracket for the brake cylinder is embodied at the guide tube of the piston cylinder aggregate or/and at the assembly group.

Item 21: Heavy-duty trailer according to one of the Items 1 to 20, characterized in that the steering lever of the wheel suspension is embodied at the piston cylinder aggregate, for example, its guide tube, or/and at the assembly group.

Item 22: Heavy-duty trailer according to one of the Items 1 to 21 characterized in that at least one wheel is a steered wheel.

Item 23: Heavy-duty trailer according to Item 22, characterized in that, viewed in a projection in longitudinal direction of the trailer, the projection surface of the brake cylinder does not overlap with the projection surfaces of the transverse control arm and the steering rod.

Item 24: Heavy-duty trailer according to Item 22 or 23 characterized in that, viewed in a vertical projection, the projection surface of the assembly group formed by the piston rod of the brake cylinder and the brake linkage in every steering position of the wheel does not overlap the projection surface of the steering rod.

Item 25: Heavy-duty trailer according to one of the Items 1 to 24, characterized in that at least one wheel is a driven wheel.

Item 26: Heavy-duty trailer according to one of the Items 1 to 25, characterized in that the articulating axis of the transverse control arm of the wheel suspension on the trailer frame is arranged below an excavator recess or central tube of the trailer.

Item 27: Heavy-duty trailer according to the preamble of the Item 1, the characteristic of Item 26 and, if desired, the characteristic of one of the Items 1 to 25, characterized in that the articulating axis of the transverse control arm is arranged on the trailer frame a least in the longitudinal center plane of the trailer, preferably on the opposite side to the assigned wheel of the longitudinal center plane.

Item 28: Heavy-duty trailer according to Item 27, characterized in that in the embodiment of the transverse control arms of two in trailer lateral direction each other opposing wheels as triangular transverse control arms, the articulation axes of the free ends of the shafts of the triangular transverse control arms are arranged so that one of the shafts of the two triangular transverse control arms, respectively, with its free end engages between the two shafts of the respective other triangular transverse control arm.

Item 29: Heavy-duty trailer according to Item 28, characterized in that the two articulation axes of the two triangular transverse control arms are all arranged in the longitudinal center plane of the trailer, wherein preferably two of the articulation axes are combined to a joint articulation axis.

Item 30: Heavy-duty trailer according to Item 28, characterized in that the articulation axes of each of the two triangular transverse control arms are arranged on the opposite side of the longitudinal center plane of the trailer of the corresponding wheel, preferably adjacent to the opposite edge of the excavator recess or central tube of the trailer.

Item 31: Heavy-duty trailer according to Items 29 or 30, characterized in that the shafts of the transverse control arms are in a bent form, wherein the concave side of the bend is in an operational state points toward the running surface.

Item 32: Heavy-duty trailer according to the preamble of Item 1, the characteristic of Item 21 and, if so desired, the characteristic of one of the Items 1 to 20 and 22 to 31, characterized in that the steering cylinders of the steering gear of the heavy-duty trailer include an angle to the trailer longitudinal direction which is different from zero, the value of which is preferably between 10° and approximately 70° and even more preferably between 35° and approximately 55°.

The invention claimed is:

1. A heavy-duty trailer comprising:
plural wheels;
plural independent wheel suspensions mounted to a chassis of the heavy-duty trailer;
one of the plural independent wheel suspensions being a first MacPherson wheel suspension;
a first control arm connecting the first MacPherson wheel suspension to the chassis;
another of the plural independent wheel suspensions being a second MacPherson wheel suspension arranged opposite the first MacPherson wheel suspension; and
a second control arm connecting the second MacPherson wheel suspension to the chassis,
wherein the first and second control arms have portions that extend past a longitudinal center plane of the chassis.

2. A heavy-duty trailer comprising:
plural wheels;
plural steerable independent wheel suspensions mounted to a chassis of the heavy-duty trailer;
one of the plural steerable independent wheel suspensions being a first MacPherson wheel suspension;
a first control arm connecting the first MacPherson wheel suspension to the chassis;
another of the plural steerable independent wheel suspensions being a second MacPherson wheel suspension arranged opposite the first MacPherson wheel suspension; and
a second control arm connecting the second MacPherson wheel suspension to the chassis,
wherein ends of the first and second control arms that connect to the chassis extend past a longitudinal center plane of the chassis.

* * * * *